May 11, 1943.    V. F. ZAHODIAKIN    2,319,097
PISTON RING
Filed June 5, 1940

INVENTOR.
BY Victor F. Zahodiakin
Wood & Wood
ATTORNEYS

UNITED STATES PATENT OFFICE 2,319,097

PISTON RING

Victor F. Zahodiakin, New York, N. Y.

Original application September 15, 1939, Serial No. 295,106. Divided and this application June 5, 1940, Serial No. 339,032

5 Claims. (Cl. 309—44)

This invention relates to improvements in packing or compression rings of the type adapted to be used with pistons. The improved ring of this invention particularly lends itself to use as a compression ring for the pistons of internal combustion engines but is not limited to this use. It is capable of use, with the same advantages, as the packing ring for the pistons of pumps, steam engines, or any installation where packings of this general type are employed.

This application is a division of my copending application, Serial No. 295,106, filed September 15, 1939.

It has been one of the objects of the present inventor to provide a piston ring adapted to the above uses which will readily and easily conform to any irregularity in the contour of a cylinder, and in this respect is of great value for use in worn cylinders. In other words, the purpose has been to provide a ring which will conform to localized irregularities or distortions as well as to general irregularities.

It has been a further object of the inventor to provide a piston ring which can be made in a simple manner by a few operations. More specifically, the ring may be made by punch press operation and the simple expedient of pressing the ring after stamping.

Specifically described, the present inventor has realized the value of distributing, around the circumference, the normal gap which must be provided in a piston ring to permit expansion and contraction and toward this end has arranged the gap in minute divisions around the entire circumference of the ring. Now to fabricate a ring with these minute clearances has presented an extremely difficult problem.

The concept here has been to provide a ring made up of segments disposed in circumferential arrangement by means which provides, when installed, either radial pressure or circumferential pressure or both. In other words the segments are connected by continuous means or otherwise to constitute a ring providing radial slits distributed around the ring. Thus the ring provides a series of independently flexible segments which may radially adjust themselves to local variations in the contour of the cylinder as well as to general irregularities or variations from a true circle.

The ring thus formed is extremely flexible and may be readily compressed for insertion into the cylinder. It will promptly adjust itself to the irregularities of the cylinder without mechanical fitting of the character required with the rings of the past.

Other objects and certain advantages of the invention will be more fully apparent from a description of the drawing in which.

The piston ring disclosed herein is made up of a multiplicity of segments 10 which are assembled on a circular ring 11. Each segment is arcuate and when the ring is installed, the space between each segment is very minute. A slot 12 cut into the inner periphery of each segment centrally thereof, terminates in a circular portion 14 centrally of the segment.

Figure 1:
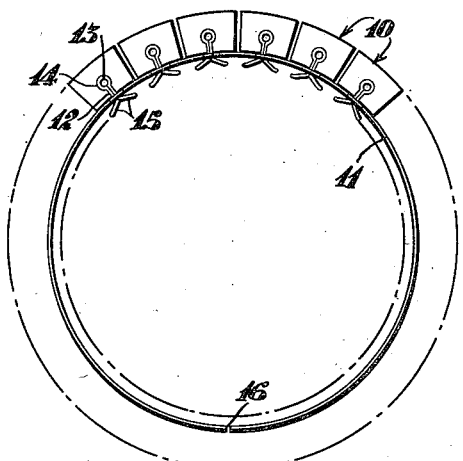
Figure 1 is a fragmentary top plan view of the ring removed from the cylinder.
Figure 2:
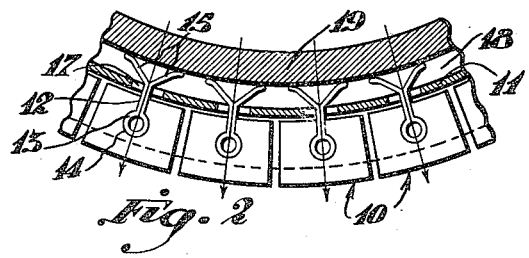
Figure 2 is a fragmentary cross-sectional view taken horizontally through the piston ring showing it in the ring groove in a cylinder.
Figure 3:
Figure 3 is a top view of one of the attachment clips for the ring segment.
Figure 4:
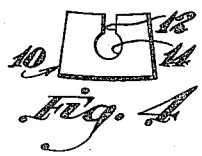
Figure 4 is a top plan view of one of the segments.
Figure 5:
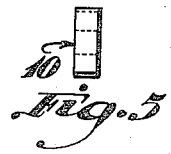
Figure 5 is a side view of the segment shown in Figure 4.
Figure 6:
Figure 6 is a fragmentary side view of the ring supporting the segments of Figure 2.

Individual segments are attached to the ring 11 by means of a clip 13 which is somewhat like a cotter pin. The clips are formed from spring steel as shown in Figure 3 so that when compressed they exert an outward or spreading force. The inner ends of each clip are spread angularly as at 15.

The ring 11 is split as at 16 so that the assembly can be slipped over a cylinder and into the ring groove. A series of slots 17 in the ring corresponding to the slots 12 in the segments are provided.

In assembling the piston ring, the clips 13 are inserted from the center of the ring 11 outwardly through the slots 16 in the ring. They are pressed together and each segment is slipped down over the head end of each clip so that the head end is disposed in the slot or opening in the segment.

Now when this assembly is placed in the groove 18 of the piston 19, the angular inner ends or fingers 15 of the clips engage the inner wall of the groove and exert a direct outward radial force urging each segment against the cylinder. Since the segments are confined in the groove, they cannot become disengaged from the clips. The normal spreading action of the clips also tends to keep the parts assembled.

Having described my invention, I claim:

1. A piston ring comprising, a series of circumferentially arranged segments, a retaining ring disposed around the inside of the segments, and, clips extended through the ring and attached to the segments, said clips including spring fingers engageable with the bottom of the piston groove when installed.

2. A piston ring comprising, a series of segments, a ring disposed around the interior of the segments, cotter pins disposed through the ring and having their head ends axially slidable in the segments, the inner ends of the cotter pins spread apart and adapted to engage the bottom of the piston groove, said cotter pins formed of spring metal.

3. A piston ring comprising a number of arcuate segments, a corresponding number of spring steel clips and a split ring having a corresponding number of slots, said segments assembled in entirely separated arrangement on the ring by means of the clips, said clips extending loosely and radially through the slots in the ring.

4. A piston ring comprising a plurality of arcuate segments, a retaining ring for supporting said segments in circumferential arrangement, said retaining ring having openings therein, one for each segment, said segments including slots disposed axially therein relative to said retaining ring, said slots having enlarged inner ends and a fastening element for each segment having a head disposed within said enlarged end of the slot, and a shank engaged through the adjacent opening in the retaining ring whereby said fastening elements hold said segments in position on said retaining ring.

5. As an article of manufacture, a plurality of circumferentially arranged sections, a circular member for supporting and maintaining said sections in circumferential arrangement, and independent pressure applying means for each section for supporting the section on the member and for urging it directly radially, when installed, independently of the circular member.

VICTOR F. ZAHODIAKIN.